US009447897B2

(12) United States Patent
Giubertoni

(10) Patent No.: US 9,447,897 B2
(45) Date of Patent: Sep. 20, 2016

(54) HANDWHEEL FOR HYDRAULIC VALVE PROVIDED WITH OPENING LEVEL INDICATOR

(71) Applicant: VIR VALVOINDUSTRIA ING. RIZZIO S.P.A., Valduggia (Vercelli) (IT)

(72) Inventor: Efrem Giubertoni, Varallo (IT)

(73) Assignee: VIR VALVOINDUSTRIA ING. RIZZIO S.P.A., Valduggia (Vercelli) (IT)

( * ) Notice: Subject to any disclaimer, the term of this patent is extended or adjusted under 35 U.S.C. 154(b) by 0 days.

(21) Appl. No.: 14/557,482

(22) Filed: Dec. 2, 2014

(65) Prior Publication Data

US 2016/0153581 A1  Jun. 2, 2016

(51) Int. Cl.
  F16K 37/00 (2006.01)
  F16K 31/60 (2006.01)
  F16K 31/53 (2006.01)
(52) U.S. Cl.
  CPC ......... *F16K 37/0016* (2013.01); *F16K 31/535* (2013.01); *F16K 31/60* (2013.01); *F16K 31/605* (2013.01); *F16K 31/607* (2013.01); *F16K 37/0008* (2013.01); *Y10T 137/8275* (2015.04); *Y10T 137/8292* (2015.04); *Y10T 137/8309* (2015.04)
(58) Field of Classification Search
  CPC ........... F16K 37/0008; F16K 37/0016; F16K 31/60; F16K 31/605; F16K 31/607; Y10T 137/8275; Y10T 137/8292; Y10T 137/8309
  USPC .................................. 116/277, 290
  See application file for complete search history.

(56) References Cited

U.S. PATENT DOCUMENTS 2,293,199 A * 8/1942 Foner ................ F16K 31/52433
                                                    116/277
3,450,091 A   6/1969 Wajdik
3,505,972 A * 4/1970 Benjamin ........... F16K 37/0016
                                                    116/277

(Continued)

FOREIGN PATENT DOCUMENTS

CH      399857      9/1965
DE    12 21 067    7/1966

(Continued)

OTHER PUBLICATIONS

Italian Search Report dated Feb. 24, 2014, corresponding to the Foreign Priority Application No. MI20130930.

(Continued)

*Primary Examiner* — Atif Chaudry
(74) *Attorney, Agent, or Firm* — Young & Thompson

(57) ABSTRACT

A handwheel (30) for hydraulic valve provided with numerical indicator of the valve opening level, comprising a base-body (32) or fixed element apt to be stably restrained with respect to the valve-body and supporting a mobile element (34) rotatably coaxial with respect to said base-body (32), connected with a member of maneuver of the valve and provided with a knob (46) apt to be gripped by a user in order to impart a rotation to said maneuver member corresponding to the value or degree of opening required for the valve indicated by figures (50) displayed through an opening or window (48) of said knob, said base-body (32) and mobile element (34) rotatably co-operating one with the other by means of a kinematic continuous coupling with double parallel internal gear.

9 Claims, 4 Drawing Sheets

(56) References Cited

U.S. PATENT DOCUMENTS

| | | | | |
|---|---|---|---|---|
| 3,656,504 | A * | 4/1972 | Topinka | F16K 37/0008 116/277 |
| 4,411,288 | A * | 10/1983 | Gain, Jr. | F16K 31/53 116/277 |
| 5,769,118 | A * | 6/1998 | Lenberg | F16K 31/60 116/277 |
| 2011/0017324 | A1 * | 1/2011 | Emanuel | E03B 7/09 137/556 |
| 2013/0133763 | A1 | 5/2013 | Sulmone | |
| 2014/0331913 | A1 * | 11/2014 | Emanuel | F16K 37/0016 116/201 |
| 2015/0107704 | A1 * | 4/2015 | Shishido | F16K 37/0016 137/556 |

FOREIGN PATENT DOCUMENTS

| | | |
|---|---|---|
| DE | 39 02 731 | 8/1989 |
| EP | 0044013 | 1/1982 |

OTHER PUBLICATIONS

European Search Report dated Jun. 10, 2015, corresponding to the European Patent Application No. 14195056.8.

* cited by examiner

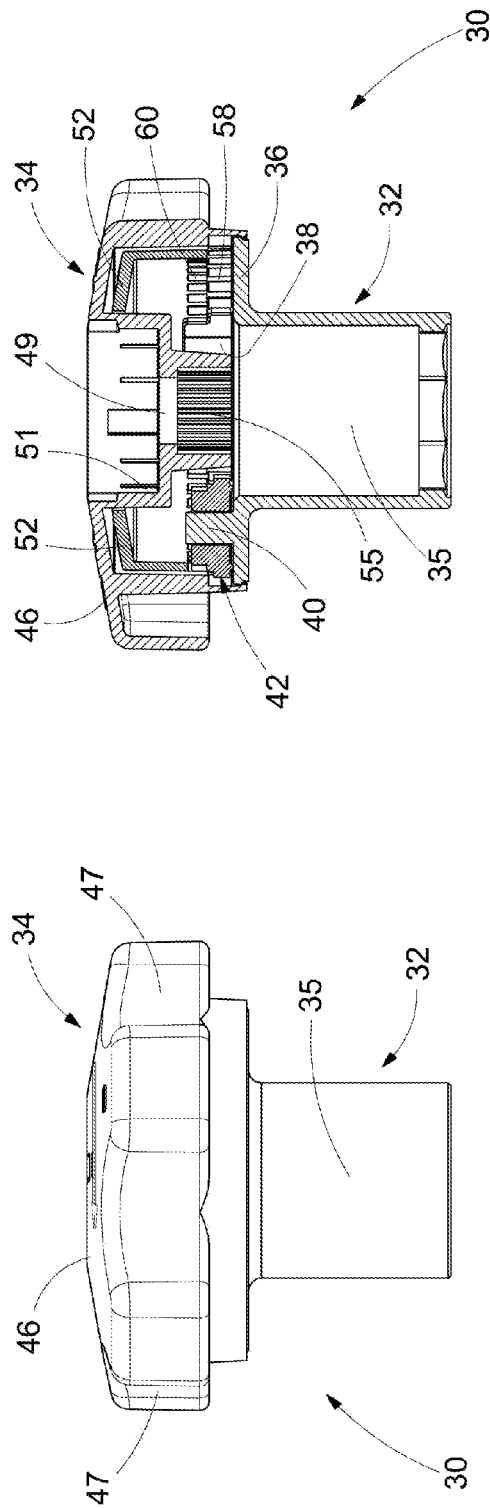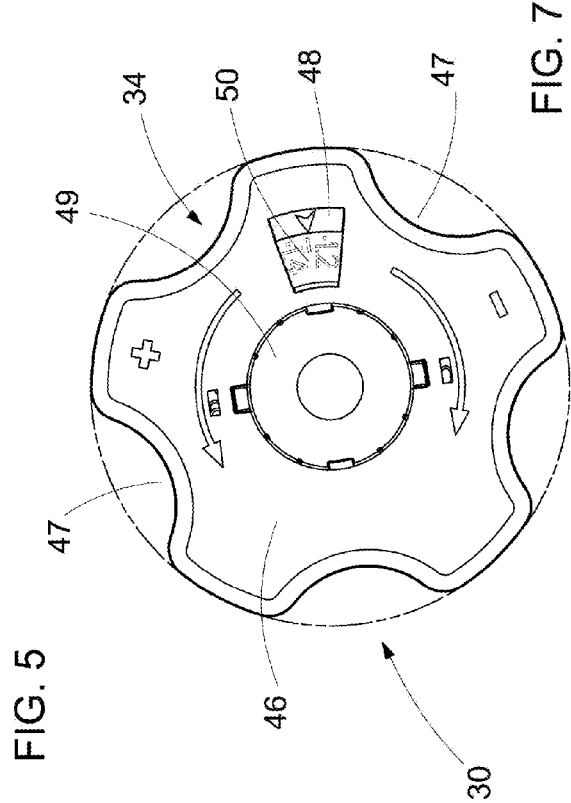

HANDWHEEL FOR HYDRAULIC VALVE PROVIDED WITH OPENING LEVEL INDICATOR

FIELD OF THE INVENTION

The object of the present invention is a handwheel for hydraulic valve provided with indicator of the level of opening of the same valve.

BACKGROUND OF THE INVENTION

More particularly the present invention relates to a handwheel for valve provided with an indicator of level of opening which exploits the particular kinematism apt to produce, univocally and ruggedly, the indication of the level of opening of the valve and to allow, at the same time, easy reading of the position of opening of the same.

As is known, hydraulic valves are typically provided with manoeuvre members defined by a lever or by a handwheel apt to allow the rotation movement of a sphere or translation of a gate or globe to perform the opening/closure of the valve and the choking of the same, so as to regulate the parameters of the flow processed.

For example, in the case of shut-off valves, the important positions are only two, i.e. the position of opening and of closure of the valve and, therefore, an indication of the intermediate positions is not necessary.

Contrarily, in the case of valves of calibration or balancing or the like, for the correct use of the valve it is appropriate to be able to allow the user to read, simply and easily, the degree of opening/closure of the valve. In some cases actual industry regulations impose the use of an indicator of the level of opening integrated with the valve (for example BS7350 (British Standard) for globe balancing valves).

Considering the valves wherein the shutter is actuated by means of a rod or screw, the movement of opening/closure of the valve is of the rotary type and performed by imparting on said rod or screw a certain number of turns, for example by means of a handwheel, in such a way as to allow the passage from a position of maximum opening to one of maximum closure.

In globe balancing valves, for example, the manoeuvre handwheel has to be provided with an indicator apt to indicate the degree of opening and, consequently, the position of regulation of the same valve with the precision of the tenth of turn. For example the indication 4.2 corresponds to an opening of four whole turns plus two tenths of a turn, i.e. $(360°\times 4)+(36°\times 2)=1512°$ of rotation of the manoeuvre member.

Multiple mechanisms and kinematisms are traditionally used to form the indicators of the degree of opening of a hydraulic valve.

Generally the degree of opening of the valve is indicated by means of two figures (the figure of the units and the figure of the decimals) displayed in two different windows or in two different positions of the manoeuvre/regulation handwheel.

In most cases the figure indicating the whole number of turns of opening is displayed inside a window formed on the handwheel, located either in the lateral part or in the upper part of the same handwheel.

A known handwheel with indicator of the degree of opening is schematised in FIG. 1 and has the figure indicating the whole number of turns written on the base of a cylindrical wheel 10, hinged on an axis integral with a knob 11, and actuated by means of a mechanism of the pin-gear wheel (FIG. 1) wherein said driven member or wheel has a series of equally distanced compartments 12 inside whereof a rung 14 engages, integral with a fixed base 16 whereon the decimal figures are indicated. The rung 14 meshes with a compartment 12 only once per turn, making the driven wheel 10 rotate through the angular interval necessary for revealing the next figure.

According to another known embodiment schematised in FIG. 2 the whole and decimal figures are given on the lateral surface of a cylindrical drum 18 which is defined by two coaxial idle wheels 18' and 18" whereon the figures indicating the whole number of turns and the decimal figures are given respectively. The cylindrical drum 18 is set in rotation by means of a drive wheel 19 provided with a rung 19' apt to engage with a cogged profile of the idle wheel 18' and a cogged ring nut 19" apt to mesh with a conjoined cogged profile of the idle wheel 18".

According to further known embodiment solutions, such as for example the one schematised in FIG. 3, the figure indicating the tenths of a turn is printed on a ring 20 integral with a mobile part 21 of the manoeuvre handwheel, while the figure indicating the units is given on a wheel 22 actuated by a mechanism of the pin-gear wheel.

However these embodiment solutions, exploiting a discontinuous coupling between the driven member and the driving member, require optimal manufacture and high precision in the production of the components apt to enter into a coupling one with the other. This entails a disadvantage linked to the fact that imprecise manufacture may entail the "slipping" of some meshings during the phases of manoeuvre with consequent imprecisions in the indication of the figures relating to the degree of opening of the valve.

A further disadvantage of the aforesaid known embodiment solutions is represented by the fact that the wheel bearing the figures indicating the whole number of turns or units is always an idle wheel and, consequently, maintains the correct position as a function only of the static friction appropriately designed and produced. Any imprecision whatsoever in manufacture can entail an increase in the clearances between the couplings, reducing said friction with correlated random movements of the driven wheel and consequent imprecisions in the indication of the degree of opening of the valve.

Another technical solution is schematised in FIG. 4. The figure indicating the tenths of a turn, given on the mobile part 23 of the manoeuvre handwheel, is displayed through a window 24 formed on a fixed base 25 of the same manoeuvre handwheel, while the figure indicating the whole numbers is printed on a slider 26 coupled to the mobile part 23 via a mechanism of the screw-lead screw type which performs the movement and consequent display of the figures.

However these traditional solutions, as well as disadvantages linked to the presence of idle wheels, can also have further major disadvantages linked, for example, to the fact that the movement and the display of the figures are actuated by means of a continuous coupling in which the figure of the units is displayed gradually and continuously, reducing the ease of reading.

Similar disadvantages can also be found in US2013/0133763 in which reference is made to a handwheel for valve provided with an indicator of position and elements of magnetic coupling, with said handwheel comprising a container element provided with a support element, a first shaft with a motor gear, a rotating element of connection between the support element and the first shaft, a train of gears coupled to the motor gear and configured to move a position indicator needle, a first magnet attached to the support element, a second magnet attached to an assembly device for the valve control handwheel and with said first and second magnets configured to maintain the support element in a stationary position with respect to the assembly device for the valve control handwheel.

SUMMARY OF THE INVENTION

The object of the present invention is that of obviating the disadvantages stated above. More particularly the object of the present invention is that of providing a handwheel for hydraulic valve provided with indicator of the level of opening of the valve apt to allow the display of the degree of opening of the valve by means of a continuous kinematic coupling.

A further object of the present invention is that of providing a handwheel for hydraulic valve which is precise in the display of the figures indicating the degree of opening of the valve and for which the sensitivity to possible imprecisions of manufacture linked to the process of industrial production of the components constituting the same handwheel is lowered.

A further object of the present invention is that of providing a handwheel for hydraulic valve apt to allow a simple and easy display of the degree of opening of the same valve.

A further object of the present invention is that of making available to users a handwheel for hydraulic valve suitable for guaranteeing a high value of resistance and reliability in time and such, moreover, as to be able to be easily and economically manufactured.

These and other objects are achieved by the invention which has the features as claimed in claim 1.

According to the invention a handwheel is provided for hydraulic valve provided with numerical indicator of the valve opening level, comprising a base-body or fixed element apt to be stably restrained with respect to the valve body and supporting a mobile element rotatably coaxial with respect to said base-body, connected with a member for manoeuvre of the valve and provided with a knob apt to be gripped by a user in order to impart a rotation to said manoeuvre member corresponding to the value or degree of opening required for the valve indicated by figures displayed through an opening or window of said knob, said base-body and mobile element rotatably co-operating one with the other by means of a kinematic continuous coupling.

Advantageous embodiments of the invention are disclosed by the dependent claims.

BRIEF DESCRIPTION OF THE DRAWINGS

The constructional and functional features of the handwheel for hydraulic valve provided with indicator of the level of opening of the valve will be made clearer by the following detailed description, in which reference is made to the accompanying drawings which represent a preferred and non-limiting embodiment thereof and in which:

FIG. 5 shows schematically a side view of the handwheel for hydraulic valve provided with indicator of the level of opening of the valve of the present invention;

FIG. 6 shows schematically a sectioned view along an axial plane of the handwheel for hydraulic valve of the invention;

FIG. 7 shows schematically a view from above of the handwheel for hydraulic valve of the invention;

Referring to FIGS. 5 to 8, the handwheel for hydraulic valve provided with indicator of the level of opening of the regulation valve of the present invention, denoted overall by 30 in the aforementioned drawings, comprises a base-body 32 defining a fixed element apt to be stably restrained with respect to the body of the regulation valve (not shown in the drawings) and supporting a mobile element 34 coaxial to said base-body and connected to the member of manoeuvre of the valve (likewise not shown in the drawings) defined by a screw or rod.

DETAILED DESCRIPTION OF THE INVENTION

Figure 2:
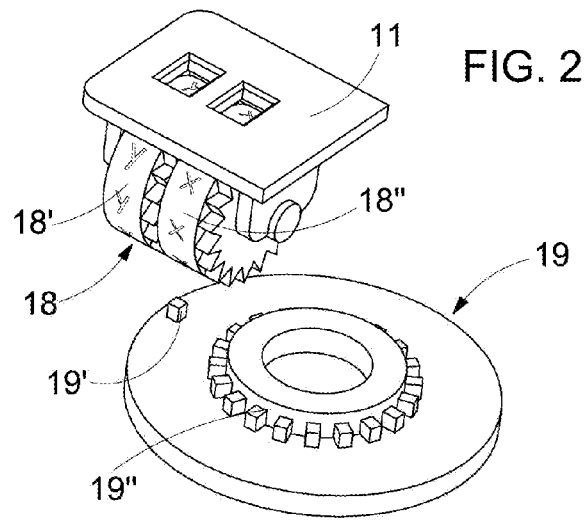
FIGS. 1 to 4 show schematically some known embodiments or solutions for regulation handwheel described previously, shown in an axonometric view.
Figure 1:
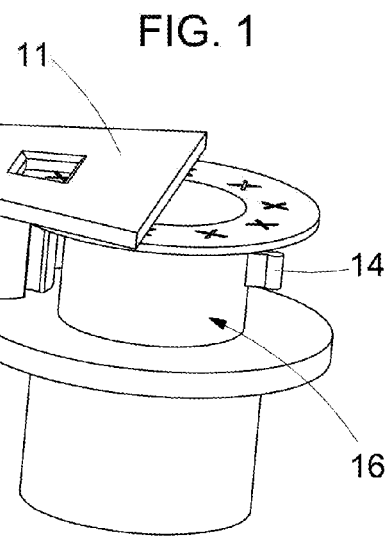
Figure 3:
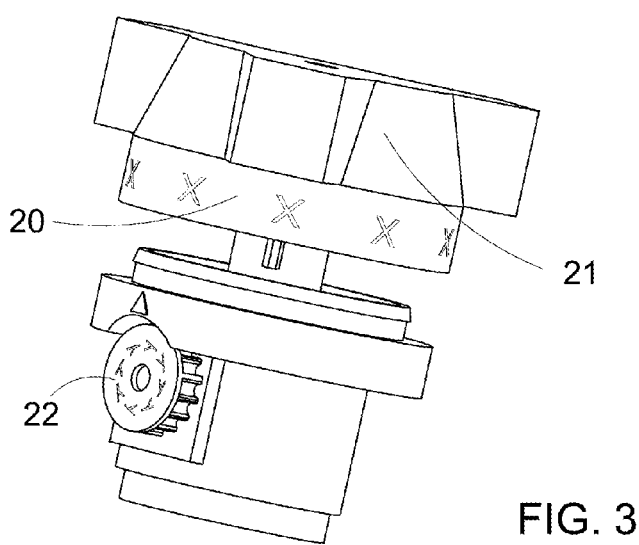
Figure 4:
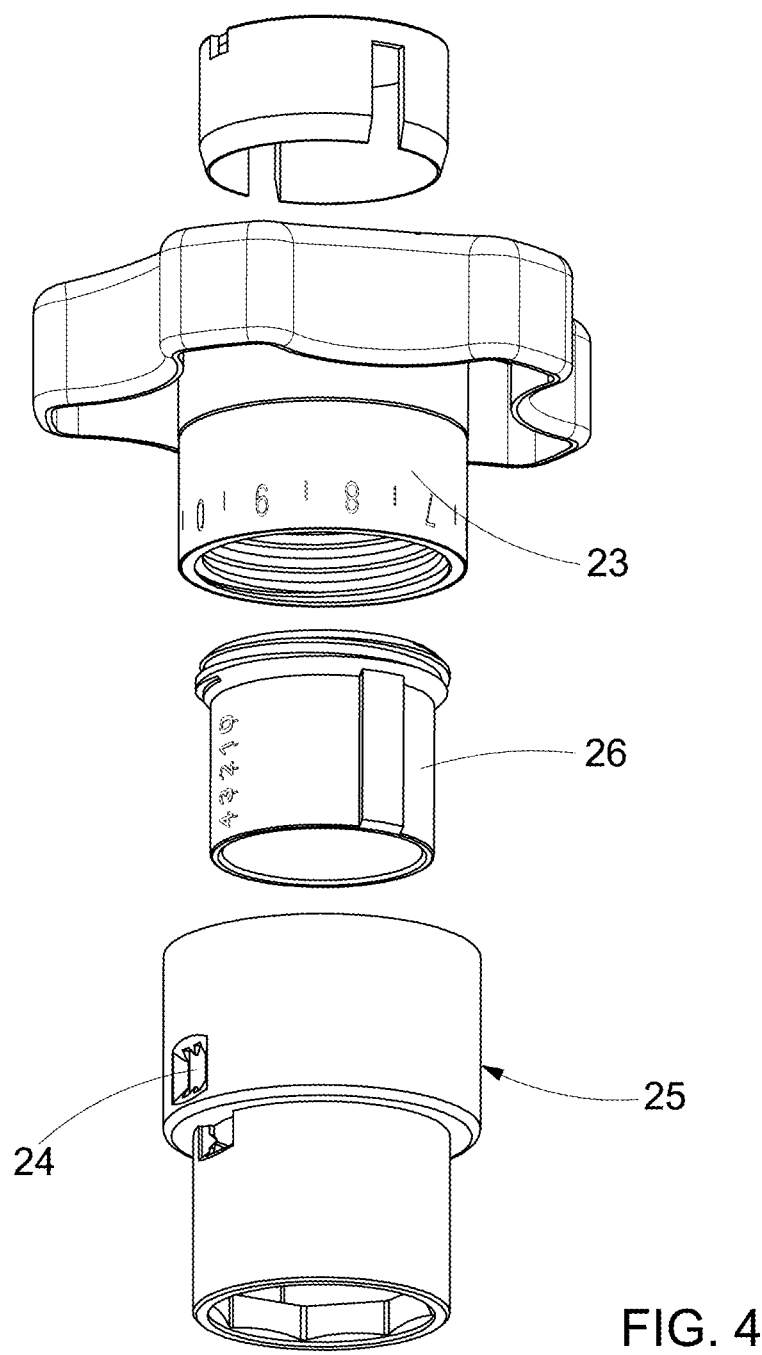
Figure 8:
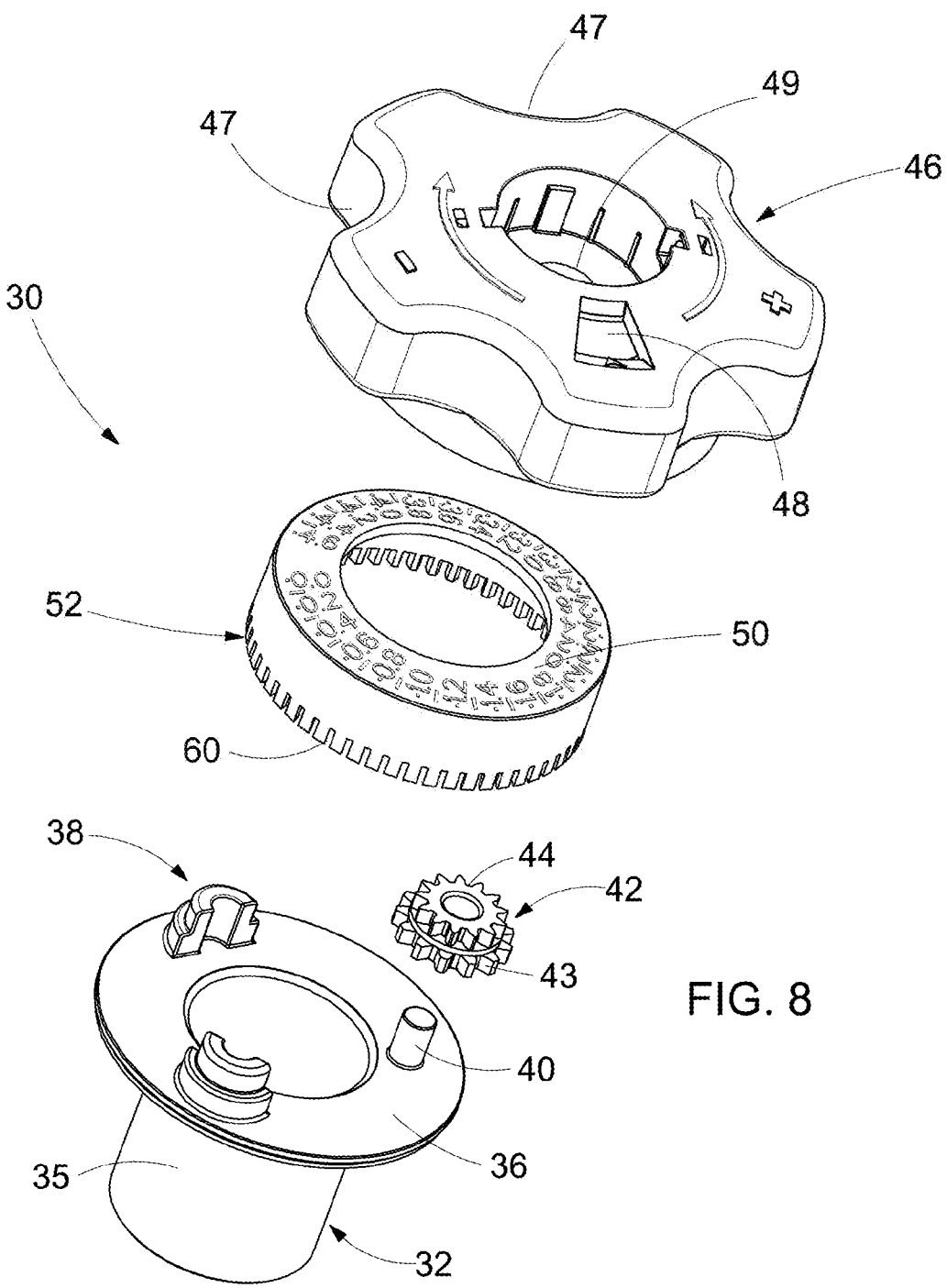
FIG. 8 shows schematically a exploded axonometric view of the handwheel for hydraulic valve of the invention.

The base-body 32 comprises a lower portion 35, tubular in shape and apt to be fitted on the regulation valve, and an upper portion 36, developed, starting from an end opposite the one turned in the direction of the valve manoeuvre member, by way of a collar circumferentially developed along a plane perpendicular to the axis of the lower portion 35.

On the upper face of the upper portion 36 a rung 40 is developed in a direction perpendicular to said face and away from it, apt to fit a satellite-pinion 42 which has an idle rotation movement with respect to said rung.

The satellite-pinion 42 comprises a first pinion 43 with a number of teeth $z_1$ and a second pinion 44 coaxially arranged above the first pinion and provided with a number of teeth $z_2$, ($z_1 \geq z_2$). Said first pinion 43 and second pinion 44 are made in a single piece to define an integrated assembly or, according to alternative embodiments, are defined by two separate elements coupled one to the other by gluing, pins or similarly known retaining means.

The mobile element 34, rotatably fitted on the base-body 32, comprises a knob 46 provided above with an opening or window 48 apt to allow the display of figures 50 (whole and decimal) present on the upper face of a crown or annular element 52 arranged inside and coaxially to the knob 46.

Elements 38, developed from the upper face of the portion 36 of the base-body 32 and in a direction parallel to the axis of the same base-body, define two supports to sustain the rotation of the annular element 52 according to what is detailed here below. The knob 46 has a substantially cylindrical shape and is provided with a plurality of pockets 47 formed in a direction parallel to the central axis and along the outer lateral surface with the function of allowing the ergonomic grip by the hand/finger of a user to impart rotation on the valve manoeuvre member.

The same knob has a central through opening 49 in axial direction, perimetrically circumscribed by a tubular appendage 51 developed integrally with the body of the same knob to form, with the side edges of the knob 46, an annular chamber 53 inside whereof the crown or annular element 52 is housed. Said central through opening 49 allows restraining of the handwheel to the rod of the valve, blocking them with a nut on the thread of the same rod or in another known and suitable manner and can, optionally, be covered above by a cap (not shown in the drawings).

Along the inner edge of the tubular appendage 51 turned in the direction of the base-body 32 a knurling 55 is formed with perimetrical development suitable for allowing the attachment of the aforementioned knob with respect to the manoeuvre member (not shown in the drawing) of the valve whereon the regulation handwheel is mounted.

The knob 46, at the lower lateral inner edge turned in the direction of the upper portion 36 of the base-body 32, has a cogged profile 58 perimetrically developed and provided with a number of teeth $z_3$. This cogged profile is, preferably, made in a single piece with the same knob.

The crown or annular element 52, along the end edge opposite the upper face whereon the figures or numbers 50 are shown indicating the opening of the valve, has a further cogged profile 60 with circumferential development and comprising a number of teeth equal to $z_4$. This cogged profile is, preferably, made in a single piece with the crown or annular element.

The cogged profile 58 of the knob 46 engages with the cogged profile of the first pinion 43 of the satellite-pinion 42.

In a substantially similar manner the cogged profile 60 of the annular element 52 is suitable for engaging, in a simultaneous manner, with the second pinion 44 of the satellite-pinion 42 of the base-body 32.

The cogged profile 58 of the knob 46 and the further cogged profile 60 of the crown or annular element 52 rotate with respect to a same axis defined by the axis of rotation of the member of manoeuvre of the valve, while the satellite-pinion 42 rotates with respect to the axis of the rung 40 drawn, according to what is detailed here below, by the rotation of the knob.

The kinematism as defined above allows therefore the display of the figures 50 representing the degree of opening of the valve by means of a double internal parallel gear.

In a preferred yet non-limiting embodiment the cogged profile 58 of the knob 46 has a number of teeth $z_3=44$, the cogged profile 60 of the annular element 52 has a number of teeth $z_4=55$ and the first pinion 43 and the second pinion 44 of the satellite-pinion 42 have a number of teeth $z_1=z_2=13$.

All the profiles of the teeth of the wheels or cogged profiles described above are of the involute to a circle type.

Moreover all the elements constituting the handwheel are made in thermoplastic polymeric material or in another known plastic material suitable for the purpose.

The functioning of the handwheel for hydraulic valve of the present invention, described in detail above with reference to its constructional features, is detailed here below.

With the rotation of the knob 46, the cogged profile 58 transmits the rotary motion to the first pinion 43 of the satellite-pinion 42 according to a transmission ratio $z_1/z_3$.

The second pinion 44, being rigidly restrained to the first pinion 43, rotates with it, transmitting the rotary motion to the crown or annular element 52 (which bears the figures indicating the variation of opening of the valve) via the meshing with the further cogged profile 60 of the same crown, with a transmission ratio $z_2/z_4$.

The modulus "m" used for the pair of wheels with number of teeth $z_1$ and $z_3$ (first pair) is greater than the modulus used for the pair of wheels with number of teeth $z_2$ and $z_4$ (second pair). This means that the further cogged profile 60 of the crown or annular element 52, while having a number of teeth $z_4$ higher than the number of teeth $z_3$ of the cogged profile 58 of the knob 46, has a smaller primitive diameter and, as a consequence thereof, it is possible to place the second pair of wheels inside the first.

The number of teeth used for the cogged profiles described above allows the obtaining of a transmission ratio different from one which performs the rotation of the annular element 52 whereon the numerical figures are given together with the knob 46 but with a slightly smaller angle with respect to that which characterises the rotation of the same knob. This means that a relative movement exists between the knob 46 and the annular element 52 and that the window 48 of the knob 46 progressively reveals different sections of the face with the numerical figures 50 of said annular element allowing the display of the single figure (in the format XX.X, i.e. units and decimals) corresponding to the degree of opening of the valve.

The total transmission ratio $w1/w4$ (where $w1=z3/z1$ and $w4=z4/z2$), like the angular spacing between the figures 50 on the annular element 52, are fixed and such that, denoted by N the total number of turns whereon it has been decided to distribute the figures 50, during this number of turns N, the annular element 52 must accumulate exactly 360° of delay with respect to the knob 46 and, consequently, must travel N−1 turns. Therefore the transmission ratio must be equal to (N−1)/N.

On the annular element 52 figures 50 are given comprised between 0.0 and (N−0.1) in that on reaching of the Nth turn the window 48 of the knob 46 reveals exactly again the figure 00.0.

In the case wherein the first pinion 43 and the second pinion 44 of the satellite-pinion 42 were to be characterised by the same number of teeth ($z_1=z_2$), the handwheel for hydraulic valve of the present invention operates according to what is described above if:

$$z_3/z_4=(N-1)/N$$

As can be seen from the above the advantages that the device of the invention achieves are clear.

The handwheel for hydraulic valve provided with indicator of the level of opening of the valve allows the advantageous display of the degree of opening of the valve by means of a kinematic continuous coupling. In fact the existence of a fully defined transmission ratio different from one allows, as described, rotation of the annular element with the figures through a slightly smaller rotation angle with respect to that of the knob, allowing different sections of the numbered ring to be displayed progressively through the window or opening of the same knob.

Further advantageous is the fact that the use of cogged wheels with involute to a circle profile allows calculation with high precision of the couplings, minimising the dragging and ensuring the constancy of the transmission ratio, reducing the risk of wear and the consequent deterioration of the geometry of the cogged profiles.

A further advantage is represented by the fact that the handwheel of the invention allows easy reading of the features of opening of the valve. This in that the window where the figure indicating the degree of opening is read allows the simultaneous display both of the units and of the decimals.

Although the invention has been described above with particular reference to one of its embodiments given solely by way of a non-limiting example, numerous changes and variations will appear clear to a person skilled in the art in light of the description given above. The present invention intends, therefore, to embrace all the modifications and the variations that fall within the scope of the following claims.

The invention claimed is:

1. A handwheel for a hydraulic valve provided with a numerical indicator of the valve opening level, the handwheel comprising:
   a mobile element; and
   a base-body or fixed element configured to be stably constrained with respect to the body of the valve and supporting the mobile element that is rotatably coaxial relative to said base-body, wherein the mobile element is connected with a member of maneuver of the valve and provided with a knob configured to be gripped by a user to impart a rotation to the maneuver member corresponding to the value or degree of opening required for the valve indicated by figures present on a crown or annular element rotatably coupled coaxially to the knob and displayed through an opening or window of said knob, and the base-body and the mobile element are rotatably co-operating with each other by a kinematic continuous coupling with a double parallel internal gear, the kinematic continuous coupling comprising at least one satellite-pinion configured to engage, simultaneously, with a cogged profile of the knob to define a first pair of wheels with a number of teeth $z1$ and $z3$ and with a further cogged profile of the crown or annular element to define a second pair of wheels with a number of teeth $z_2$ and $z_4$, with $z_3 < z_4$ and $z_1 \geq z_2$ and with said first pair of wheels whose modulus "m" is greater than that of the second pair of wheels.

2. The handwheel for valve according to claim 1, wherein the satellite-pinion is rotatably idle with respect to the base-body, is fitted on a pin of an upper portion of the base-body, and comprises a first pinion with a number of teeth $z1$ and a second pinion (44) coaxially arranged above said first pinion and provided with a number of teeth $z_2$, said first and second pinions coupled rigidly to each other.

3. The handwheel for hydraulic valve according to claim 2, wherein the cogged profile is formed perimetrically along an inner lower edge of the knob with a number of teeth $z_3$ and the further cogged profile with a number of teeth $z_4$ is circumferentially formed along a lower edge of the crown or annular element opposite to an upper face on which are represented the figures or numbers indicating the opening of the valve.

4. The handwheel for hydraulic valve according to claim 1, wherein the cogged profile is formed perimetrically along an inner lower edge of the knob with a number of teeth $z_3$ and the further cogged profile with a number of teeth $z_4$ is circumferentially formed along a lower edge of the crown or annular element opposite to an upper face on which are represented the figures or numbers indicating the opening of the valve.

5. The handwheel for hydraulic valve according to claim 1, wherein the profiles of the teeth of the satellite-pinion, the cogged profile of the knob, and the further cogged profile of the annular element are involute to a circle.

6. The handwheel for hydraulic valve according to claim 1, wherein the crown or annular element is arranged coaxially with respect to the knob inside an annular chamber of the knob itself.

7. The handwheel for hydraulic valve according to claim 1, wherein the figures on the crown or annular element are comprised between 0.0 and (N−0.1), with N indicating the total number of turns on which the figures are distributed.

8. The handwheel for hydraulic valve according to claim 7, wherein the transmission ratio between the first pair and the second pair of wheels is equal to (N−1)/N.

9. The handwheel for hydraulic valve according to claim 1, wherein the handwheel is made from thermoplastic polymeric material.

\* \* \* \* \*